Figure 7:
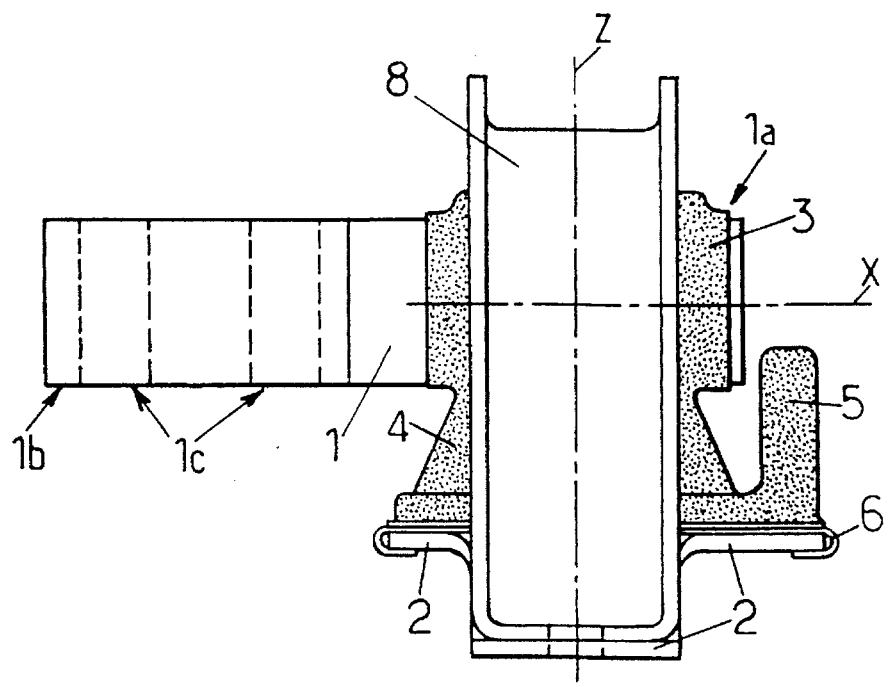

United States Patent [19]
Bellamy et al.

[11] Patent Number: 5,556,071
[45] Date of Patent: Sep. 17, 1996

[54] HYDRAULIC VIBRATION-DAMPING MOUNTS

[75] Inventors: Alain Bellamy, Naveil; Denis Reh, Chateaudun; André Girard, La Chapelle du Noyer; Gilles Chenais, Marboue, all of France

[73] Assignee: Hutchinson, Paris, France

[21] Appl. No.: 294,473

[22] Filed: Aug. 22, 1994

[30] Foreign Application Priority Data

Oct. 5, 1993 [FR] France .................. 93 11848

[51] Int. Cl.⁶ .................................................. F16M 13/00
[52] U.S. Cl. ........................ 248/634; 248/636; 248/638
[58] Field of Search ................................ 248/562, 636, 248/634, 638, 659; 267/140.13, 140.11, 140.12, 140.5

[56] References Cited

U.S. PATENT DOCUMENTS

| | | | |
|---|---|---|---|
| 4,767,106 | 8/1988 | Le Fol | 267/140.1 |
| 4,768,759 | 9/1988 | Bellamy et al. | 267/140.1 |
| 4,886,253 | 12/1989 | Lun | 267/140.1 |
| 4,946,147 | 8/1990 | Kato et al. | 267/140.1 |
| 4,986,510 | 1/1991 | Bellamy et al. | 248/562 |
| 5,286,012 | 2/1994 | Garety et al. | 267/140.13 |

FOREIGN PATENT DOCUMENTS

| | | |
|---|---|---|
| 0012638 | 6/1980 | France . |
| 2587429 | 3/1987 | France . |
| 2628805 | 9/1989 | France . |
| 2192968 | 1/1988 | United Kingdom . |

OTHER PUBLICATIONS

Patent Abstracts of Japan; vol. 14, No. 209 (M–968) (4152) 27 Apr. 1990 & JP-A-02 046 337 (Honda Motor Co Ltd.) *abstract*.
Patent Abstracts of Japan; vol. 6, No. 187 (M–158) (1065) 25 Sep. 1982 & JP-A-57 094 144 (Kinugawa Gomu Kogyo K.K.) *abstract*.

Primary Examiner—Karen J. Chotkowski
Assistant Examiner—Gwendolyn Wrenn
Attorney, Agent, or Firm—Larson and Taylor

[57] ABSTRACT

The invention relates to a hydraulic vibration-damping mount including a first rigid reinforcing member (1) and a second rigid reinforcing member (2), an elastomeric body (3) which includes, on the one hand, a thick wall (4) joining the two rigid reinforcing members to one another and partially delimiting a working chamber (A), and, on the other hand, a thin wall (5) which partially delimits a compensation chamber (B) connected to the working chamber by a narrow duct (C), the two chambers and the narrow duct being filled with a liquid, the second reinforcing member being a plate one face of which is secured in leaktight fashion to the elastomeric body in order to delimit, together with the latter, the two chambers and the narrow duct, the thin wall substantially exhibiting the shape of a bell only the edge ($5_1$) of which is secured to the second reinforcing member.

11 Claims, 3 Drawing Sheets

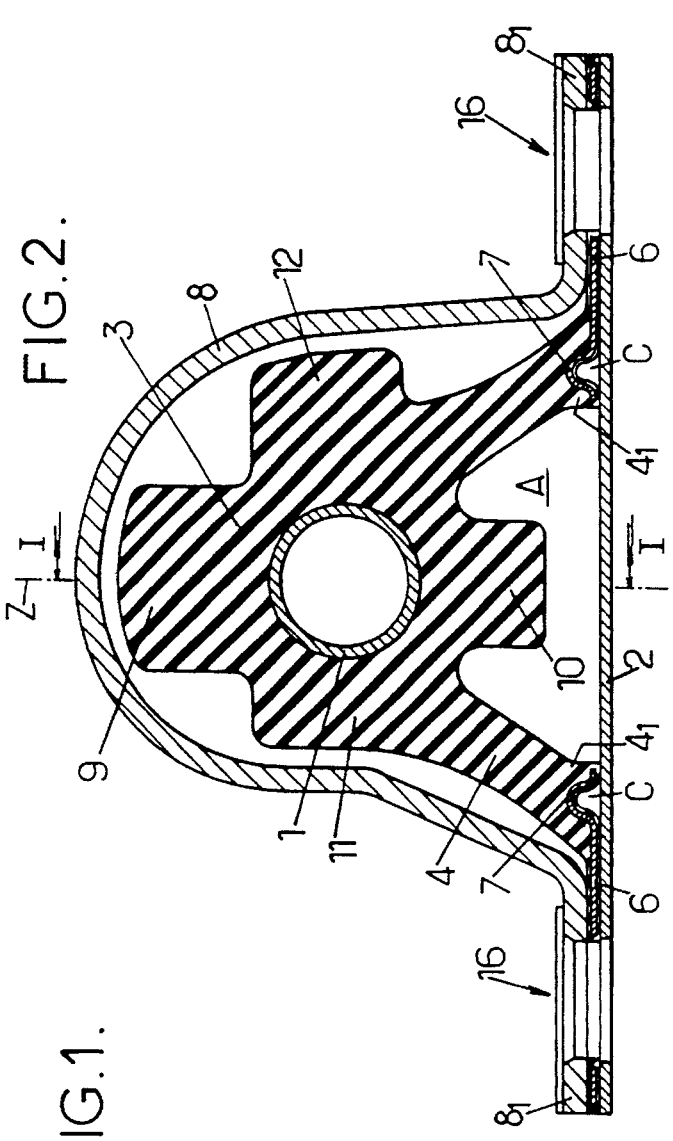
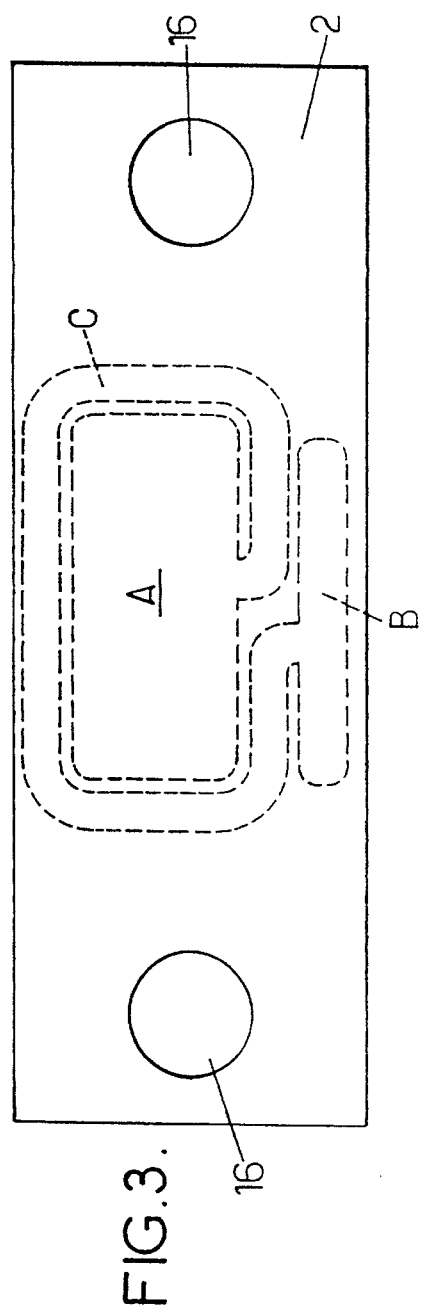
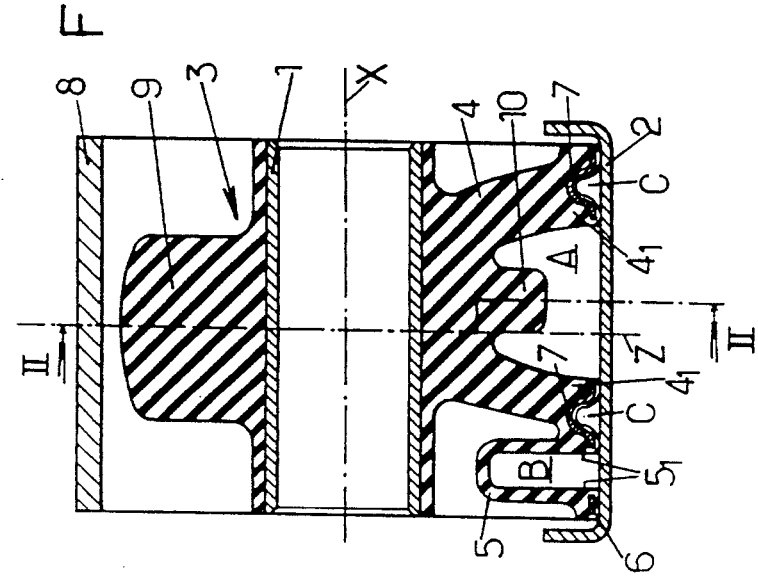

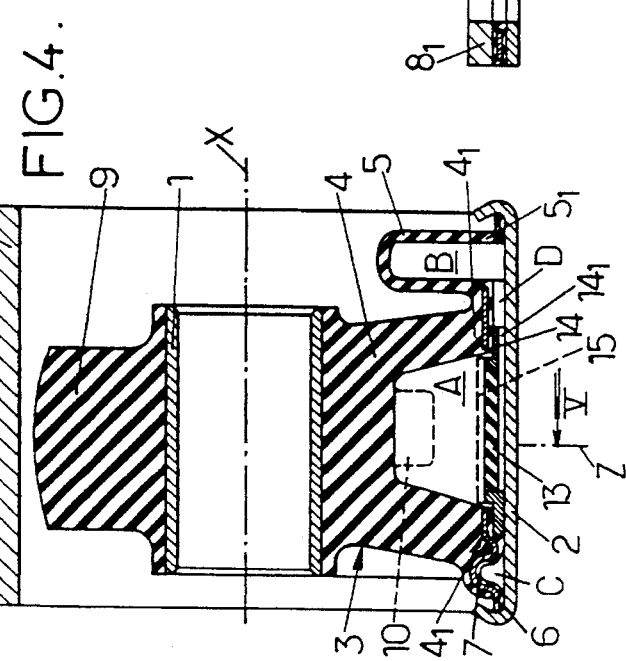

HYDRAULIC VIBRATION-DAMPING MOUNTS

The invention relates to vibration-damping mounts intended to be interposed for the purposes of damping and connection, between two rigid elements such as a vehicle chassis and a vehicle engine, in order to damp out the vibrational movements between these two rigid elements, essentially in a main direction of vibration Z.

Among these vibration-damping mounts, the invention more particularly relates to those which include a first rigid reinforcing member and a second rigid reinforcing member which can be secured respectively to the two rigid elements to be joined together, an elastomeric body which includes a thick wall joining the two rigid reinforcing members to one another and partially delimiting a working chamber, this elastomeric body further including a freely deformable thin wall which partially delimits a compensation chamber communicating with the working chamber via a narrow duct, the two chambers and the narrow duct being filled with a liquid, one of the two reinforcing members, hereafter termed second reinforcing member, being a plate which is substantially perpendicular to the main direction of vibration Z and which exhibits a face secured in leaktight fashion to the elastomeric body in order to delimit, together with the latter, the two chambers and the narrow duct, the thick wall exhibiting a substantially peripheral edge which is secured to the second reinforcing member.

Vibration-damping mounts of this type have the advantage of exhibiting a small heightwise space requirement, in contrast with vibration-damping mounts in which the working and compensation chambers are aligned in the Z-direction instead of being juxtaposed. In addition, they are composed of a small number of components, insofar as their elastomeric body is molded as a single piece and insofar as they do not require any rigid partition interposed between the working and compensation chambers, by contrast with vibration-damping mounts in which the working and compensation chambers are aligned in the Z-direction instead of being juxtaposed.

Such a device is described, for example, in the document EP-0,236,199.

However, in the vibration-damping mount disclosed by this document, the compensation chamber is delimited by two thick lateral walls and a thin bottom, which thin bottom represents a small proportion of the internal surface which delimits the compensation chamber. As a consequence, the compensation chamber is only slightly deformable, so that it has to have a large volume to allow variations in volume, corresponding to those of the working chamber.

The object of the present invention is especially to overcome this drawback.

To this end, the thin wall substantially exhibits the shape of a bell including a substantially peripheral edge which is secured to the second reinforcing member, said thin wall being connected to the thick wall only by part of said edge, the working chamber and compensation chamber being juxtaposed non-concentrically on the face of the second reinforcing member which is secured to the elastomeric body.

Thus, the wall of the compensation chamber is deformable over its entire surface, except in the vicinity of its edge, which is secured to the second reinforcing member of the vibration-damping mount. In this way, the wall of the compensation chamber is very deformable, so that the volume of the compensation chamber can be minimized at rest.

In addition, the deformations of the thick wall do not disturb the operation of the compensation chamber, owing to the fact that the thin wall is separated from the thick wall.

Finally, the location of the compensation chamber which is juxtaposed with the working chamber on one face of the rigid plate which constitutes the second reinforcing member, especially allows:

- simpler molding of the elastomeric body,
- greater freedom of selection, when designing the mount, of the dimensions of the rigid plate which constitutes the second reinforcing member as a function of the space available for the vibration-damping mount in the vehicle for which it is intended,
- and greater freedom of selection, when designing the mount, of the routing of the narrow duct, at the interface between the elastomeric body and the rigid plate which constitutes the second reinforcing member, in order to choose the length of this narrow duct to determine the frequency for which the damping afforded by the vibration-damping mount is maximal, which frequency depends on the ratio between the length and the diameter of the narrow duct.

In preferred embodiments of the invention, recourse is had to one/other of the following provisions

- the edges of the thick wall and of the thin wall of the elastomeric body are overmolded onto a rigid perforated plate which is fixed to the second reinforcing member, especially by crimping;
- the narrow duct is formed by a groove in the perforated plate, the edges of said groove being applied in leaktight contact against the second reinforcing member;
- the first reinforcing member is a member which is elongate along an axis X substantially perpendicular to the main direction of vibration Z, the mount further including a rigid hoop which is fixed to the second reinforcing member and which is located around the first reinforcing member and the elastomeric body, the elastomeric body including at least a first boss which extends opposite the second reinforcing member from the first reinforcing member, this first boss being suitable for abutting against the hoop in order to limit the travel of the first reinforcing member away from the second reinforcing member in the main direction of vibration Z, according to a principle close to the one taught by the document FR-A-2,628,805;
- the elastomeric body includes a second boss which extends toward the second reinforcing member from the first reinforcing member and which penetrates inside the working chamber in order to limit the travel of the first reinforcing member toward the second reinforcing member;
- the elastomeric body further includes at least one lateral boss which extends toward the hoop substantially perpendicularly to the main direction of vibration Z from the first reinforcing member, and which is suitable for abutting against the hoop in order to limit the excursion of the first reinforcing member parallel to the second reinforcing member;
- the hoop is a curved plate, which covers the thin wall of the elastomeric body;
- the compensation chamber is aligned with respect to the working chamber parallel to the axis X;
- the first reinforcing member is a rigid arm which exhibits a part onto which the elastomeric body is overmolded, and which also exhibits a projecting part extending out of the elastomeric body and provided with fixing means;

the two chambers are connected by a secondary passage which is closed off by a valve having a limited excursion;

the valve is mounted on a support which is interposed between the working chamber and the second reinforcing member, the valve having one side in contact with the liquid contained in the working chamber and one side pointing toward the second reinforcing member, which communicates with the compensation chamber by means of the secondary passage, said secondary passage being formed between the elastomeric body and the secondary reinforcing member.

Other features and advantages of the invention will emerge during the following detailed description of three of its embodiments, given by way of non-limiting examples with reference to the appended drawings.

Figure 8:
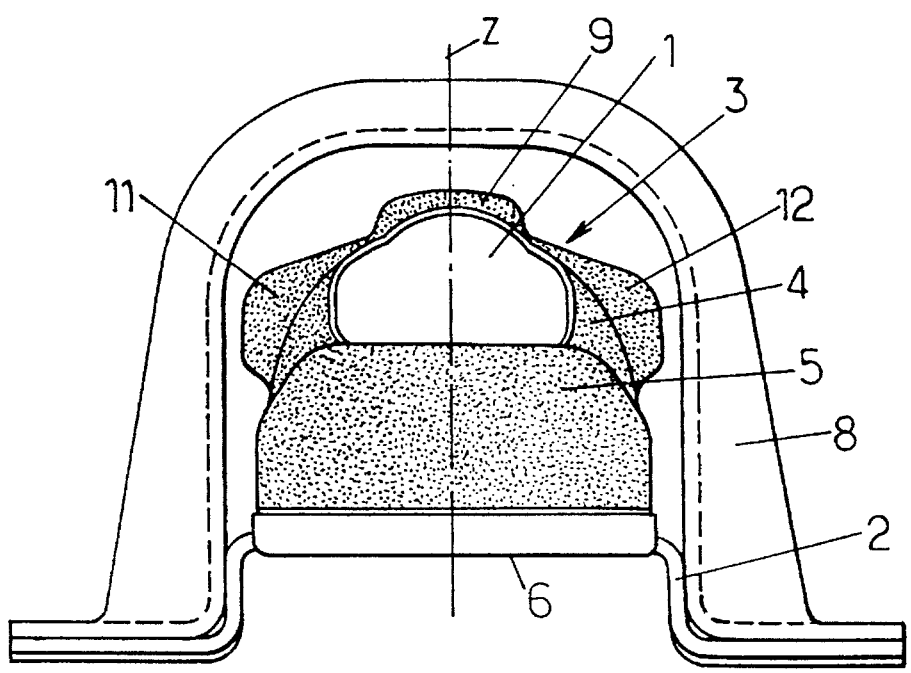

In these drawings:

FIG. 1 is a view in section of a first embodiment of the invention, the section being taken along the line I—I of FIG. 2, FIG. 2 is a view in section along the line II—II of FIG. 1, FIG. 3 is a view from below of the device of FIGS. 1 and 2, FIGS. 4 to 6 are views similar to FIGS. 1 to 3 for a second embodiment of the invention, and FIGS. 7 to 8 are elevations, respectively from the side and from the end, of a third embodiment of the invention.

In the various figures, the same references denote identical or similar elements.

In the first embodiment of the invention, represented in FIGS. 1 to 3, the vibration-damping mount includes two metal reinforcing members 1 and 2 which are joined to one another by an elastomeric body 3. The first reinforcing member 1 is tubular in the example represented, and exhibits a longitudinal axis X. More generally, the first reinforcing member 1 may have the shape of a solid or hollow elongate member of circular or noncircular cross-section, The second reinforcing member 2, for its part, is a plate which exhibits a planar overall shape, or at least in part, and which extends parallel to the axis X of the first reinforcing member.

The elastomeric body 3 is secured to the first reinforcing member 1 by vulcanization. It includes a thick wall 4 which extends from the first reinforcing member 1 up to the second reinforcing member 2, in the direction Z in which vibrational movements between the two reinforcing members are to be damped out. The Z-direction is perpendicular to the axis X and to the plane of the second reinforcing member 2, and it is generally vertical.

The thick wall 4 exhibits sufficient compressive strength to withstand a load applied to the first reinforcing member parallel to the Z-axis and pointing toward the second reinforcing member.

The thick wall 4 includes a free edge $4_1$ which is secured in leaktight fashion to the second reinforcing member 2, thus delimiting a working chamber A which here has a rectangular horizontal section.

The elastomeric body 3 further includes a flexible thin wall 5 which is Juxtaposed with the thick wall 4 and which exhibits a bell shape with a free edge $5_1$ which is also secured to the second reinforcing member 2, thus delimiting a compensation chamber B which here also has a rectangular horizontal section.

The two chambers A and B communicate by means of a narrow duct C which has the shape of a groove hollowed from the elastomeric body 3, the edges of the groove being in leaktight contact against the second reinforcing member 2.

The chambers A and B, as well as the narrow duct C are filled with liquid. When the two reinforcing members 1 and 2 undergo relative vibrational movements, the thick wall 4 of the elastomeric body deforms, which gives rise to variations in volume of the working chamber A. These variations in volume lead to transfers of liquid between the chambers A and B, by means of the narrow duct C, the variations in volume of the working chamber A being compensated by complementary variations of the compensation chamber B, the thin wall 5 of which can easily be deformed. Around a certain frequency, which essentially depends on the dimensions of the narrow duct C and the mass per unit volume of the liquid moving in said narrow duct, a resonance phenomenon occurs in the narrow duct C which gives rise to a high degree of damping of the vibrations between the two reinforcing members 1 and 2.

In the example represented, the elastomeric body 3 is overmolded onto a perforated metal plate 6 which is located on the face of the elastomeric body which is in contact with the second reinforcing member 2. Thus the second reinforcing member 2 may be secured to the elastomeric body by crimping of said second reinforcing member onto said perforated plate 6 (see FIG. 4 in particular).

Furthermore, the perforated plate 6 includes groove 7 which determines the shape of the narrow duct C with great accuracy.

The vibration-damping mount of FIGS. 1 to 3 further includes a metal hoop 8 which is fixed rigidly to the second reinforcing member 2. The hoop 8 surrounds the first reinforcing member 1 and the elastomeric body 3, and it extends parallel to the X-axis.

In the example represented, the hoop 8 is a bent plate, which covers all of the elastomeric body so as to protect it against impacts from external bodies. This is advantageous insofar as the thin wall 5 is fragile and exposed beside the thick wall 4.

The hoop 8 includes two lateral extensions $8_1$ respectively on each side of the elastomeric body 3. These lateral extensions each cover a part of the perforated plate 6 which itself covers the second reinforcing member. In addition, these three elements have a hole 16 passing through them at each extension $8_1$. These holes 16 allow the vibration-damping mount to be fixed to a rigid component, by means of screws or bolts (not represented), further supplementing the securing of the various parts of the vibration-damping mount by means of the extensions $8_1$ being gripped onto the plate 6 and the second reinforcing member 2.

The elastomeric body 3 includes a first boss 9 which extends parallel to the Z-axis from the first reinforcing member 1, in the opposite direction to the second reinforcing member 2. This boss 9 is suitable for abutting against the upper part of the hoop 8, thus limiting the travel of the first reinforcing member away from the second reinforcing member.

The elastomeric body 3 further includes a second boss 10, which extends from the first reinforcing member 1 toward the second reinforcing member 2, parallel to the Z-axis, and which penetrates into the working chamber A. This second boss 10 is suitable for abutting against the second reinforcing member 2, thus limiting the possible travel of the first reinforcing member toward the second reinforcing member.

Finally, the elastomeric body includes lateral bosses 11, 12 which ere substantially diametrically opposed with respect to the first reinforcing member 1, and which are suitable for abutting against the hoop 8 when the first reinforcing member is moved substantially parallel to the second reinforcing member 2, and perpendicularly to the first reinforcing member 1.

The second embodiment of the invention, represented in FIGS. 4 to 6, includes many elements common to the first embodiment, and will therefore not be described in detail here. This second embodiment can be differentiated from the first embodiment by the fact that the two chambers A and B are also joined to one another by a secondary passage D of large cross section and short length, which is formed between the elastomeric body 3 and the second reinforcing member 2.

The passage D is closed off by a valve which here is a flexible elastomeric membrane 13, the excursion of which is limited, and which makes it possible for high-frequency low-amplitude vibrations not to be transmitted from one reinforcing member to the other, in a way which is well known.

In effect, a high-frequency low-amplitude vibration exerted on one of the two reinforcing members is transmitted to the membrane 13 by the liquid and is manifested in a rapid succession of alternating deformations of this membrane perpendicularly to itself, of amplitude less than the maximum possible value. The dimensions of the membrane are sufficient for the liquid not then to be discharged through the narrow duct C in opposite directions in synchronism with said vibration.

In contrast, for oscillations of higher amplitude and lower frequency, the amplitude of the corresponding deformations of the membrane 13 reaches its maximum possible value and the liquid is then discharged through the narrow duct C, which provides the desired hydraulic damping effect, by throttling of this liquid.

In the example represented; the flexible membrane 13 is connected by its outer edge to a metal frame 14 which is interposed between the free edge $4_1$ of the thick wall 4 of the elastomeric body, and the second reinforcing member 2.

The metal frame 14 positions the membrane 13 at a slight distance above the second reinforcing member 2, and together with the second reinforcing member it defines a passage $14_1$ which causes the lower face of the membrane 13 to communicate with the secondary passage D and the compensation chamber B, while the upper face of the membrane 13 is in contact with the working chamber A.

The downward excursion of the membrane 13 is limited by the second reinforcing member 2, whereas the upward excursion of the membrane 13 is limited solely by the elasticity of the membrane.

Possibly, the membrane 13 could be covered by a metal mesh 15, which limits its upward excursion.

When such a mesh 15 exists, the membrane 13 may possibly not be secured to the frame 14 and it may possibly be rigid. In this case, the membrane 13 may possibly be located between two identical meshes, which limit its upward and downward excursion.

When the vibration-damping mount includes a mesh 15, the elastomeric body may include the abovementioned boss 10, which limits the travel of the first reinforcing member toward the second reinforcing member. In contrast, when the vibration-damping mount does not have the mesh 15, it is preferable for the elastomeric body not to include this boss 10 which would risk damaging the membrane 13.

The third embodiment of the invention, represented in FIGS. 7 and 8, is similar to the first and second embodiments already described, and will therefore not be described in detail.

In this third embodiment, the first reinforcing member 1 is a rigid arm which extends axially between a first end 1a onto which the elastomeric body 3 is overmolded, and a second end 1b which projects out of the elastomeric body 3 and which is provided with fixing holes 1c or other fixing means. It is thus possible to fix the second end 1b of the rigid arm 1 to a motor vehicle engine, the rigid plate 2 then being fixed to the chassis of the vehicle.

We claim:

1. A hydraulic vibration-damping mount intended to be interposed between two rigid elements in order to damp out vibrations between these two elements, essentially in a main direction of vibration Z, this mount including a first rigid reinforcing member and a second rigid reinforcing member which can be secured respectively to the two rigid elements to be joined together, an elastomeric body which is molded as a single piece and which includes a thick wall joining the two rigid reinforcing members to one another and partially delimiting a working chamber, this elastomeric body further including a freely deformable thin wall which partially delimits a compensation chamber communicating with the working chamber via a narrow duct, the two chambers and the narrow duct being filled with a liquid, one of the two reinforcing members, hereafter termed second reinforcing member, being a plate extending substantially parallel to an overall plane which is substantially perpendicular to the main direction of vibration Z, said plate exhibiting a support face secured in leaktight fashion to the elastomeric body in order to delimit, together with the elastomeric body, the two chambers and the narrow duct, the thick wall exhibiting a substantially peripheral first edge which is secured to said support face, wherein the thin wall substantially exhibits the shape of a bell including a substantially peripheral second edge which is secured to said support face, said thin wall being substantially completely separated from said thick wall and being connected to the thick wall only by part of said peripheral second edge, and the working chamber and compensation chamber being juxtaposed nonconcentrically on said support face.

2. The vibration-damping mount as claimed in claim 1, wherein the edges of the thick wall and of the thin wall of the elastomeric body are overmolded onto a rigid perforated plate which is fixed to the second reinforcing member.

3. The vibration-damping mount as claimed in claim 2, wherein the narrow duct is formed by a groove in the perforated plate, the edges of said groove being applied in leaktight contact against the said support face.

4. The vibration-damping mount as claimed in claim 1, wherein the first reinforcing member is a member which is elongate along an axis X substantially perpendicular to the main direction of vibration Z, the mount further including a rigid hoop which is fixed to the second reinforcing member and which is located around the first reinforcing member and the elastomeric body, the elastomeric body including at least a first boss which extends opposite the second reinforcing member from the first reinforcing member, this first boss being suitable for abutting against the hoop in order to limit the travel of the first reinforcing member away from the second reinforcing member in the main direction of vibration Z.

5. The vibration-damping mount as claimed in claim 4, wherein the elastomeric body includes a second boss which extends toward the second reinforcing member from the first reinforcing member and which penetrates inside the working chamber in order to limit the travel of the first reinforcing member toward the second reinforcing member.

6. The vibration-damping mount as claimed in claim 4, wherein the elastomeric body further includes at least one lateral boss which extends toward the hoop substantially perpendicularly to the main direction of vibration Z from the first reinforcing member, and which is suitable for abutting against the hoop in order to limit the excursion of the first reinforcing member parallel to the second reinforcing member.

7. The vibration-damping mount as claimed in claim 4, wherein the hoop is a curved plate, which covers the thin wall of the elastomeric body.

8. The vibration-damping mount as claimed in claim 4, wherein the compensation chamber is aligned with respect to the working chamber parallel to the axis X.

9. The vibration-damping mount as claimed in claim 4, wherein the first reinforcing member is a rigid arm which exhibits a part onto which the elastomeric body is overmolded, and which also exhibits a projecting part extending out of the elastomeric body and provided with fixing means.

10. The vibration-damping mount as claimed in claim 1, wherein the two chambers are connected by a secondary passage which is closed off by a valve having a limited excursion.

11. The vibration-damping mount as claimed in claim 10, wherein the valve is mounted on a support which is interposed between the working chamber and the second reinforcing member, the valve having one side in contact with the liquid contained in the working chamber and one side pointing toward the second reinforcing member, which communicates with the compensation chamber by means of the secondary passage, said secondary passage being formed between the elastomeric body and said support face.

* * * * *